(12) United States Patent
Baker et al.

(10) Patent No.: US 6,267,484 B1
(45) Date of Patent: Jul. 31, 2001

(54) STORAGE BOX WITH UNIFORM LIGHT SOURCE

(76) Inventors: Todd C Baker; Penny Brooks, both of 1912 Cliffside Dr., Pfafftown, NC (US) 27040

( * ) Notice: Subject to any disclaimer, the term of this patent is extended or adjusted under 35 U.S.C. 154(b) by 0 days.

(21) Appl. No.: 09/358,678

(22) Filed: Jul. 22, 1999

Related U.S. Application Data

(60) Provisional application No. 60/095,032, filed on Aug. 3, 1998, and provisional application No. 60/123,969, filed on Mar. 12, 1999.

(51) Int. Cl.[7] .................................................. F21W 131/30
(52) U.S. Cl. ............................................ 362/156; 362/154
(58) Field of Search ...................................... 362/154, 156

(56) References Cited

U.S. PATENT DOCUMENTS

| | | | | |
|---|---|---|---|---|
| 2,179,409 | * | 11/1939 | Hulsart .................................. | 362/154 |
| 3,938,132 | | 2/1976 | Cunningham ......................... | 340/321 |
| 4,621,308 | * | 11/1986 | Holmberg et al. .................... | 362/154 |
| 4,691,470 | | 9/1987 | Landell et al. ........................ | 43/55 |
| 4,697,379 | | 10/1987 | McPhaul ............................... | 43/54.1 |
| 4,855,881 | * | 8/1989 | Pence .................................... | 362/154 X |
| 4,927,015 | * | 5/1990 | Jones .................................... | 362/154 X |
| 5,311,413 | * | 5/1994 | Farmer et al. ........................ | 362/154 |
| 5,333,408 | * | 8/1994 | Simmons .............................. | 362/154 |
| 5,459,648 | * | 10/1995 | Courtney .............................. | 362/154 |
| 5,611,170 | | 3/1997 | McGuff et al. ....................... | 43/57.1 |

\* cited by examiner

*Primary Examiner*—Laura K. Tso
(74) *Attorney, Agent, or Firm*—Robert W. Pitts

(57) ABSTRACT

A portable box 2 includes a base or bottom bin 10 having a storage area 24 and a hinged lid 40 in which a light source 70, such as a tubular flourescent lamp is located. The lid 40 rotates in one direction to open the box 2, and stacked trays 72, 74, 76, normally stored in the storage area 24, rotate in an opposite direction so that the light source 70 directly illuminates both the storage area and the deployed trays. Hinges 26 and 58 permit the lid 40 to rotate through an angle of slightly more than ninety degrees so that in the open position the lid 40 is positioned so that the fluorescent lamp uniformly and directly illuminates not only all of the contents of the box, but also the immediate surrounding area.

15 Claims, 5 Drawing Sheets

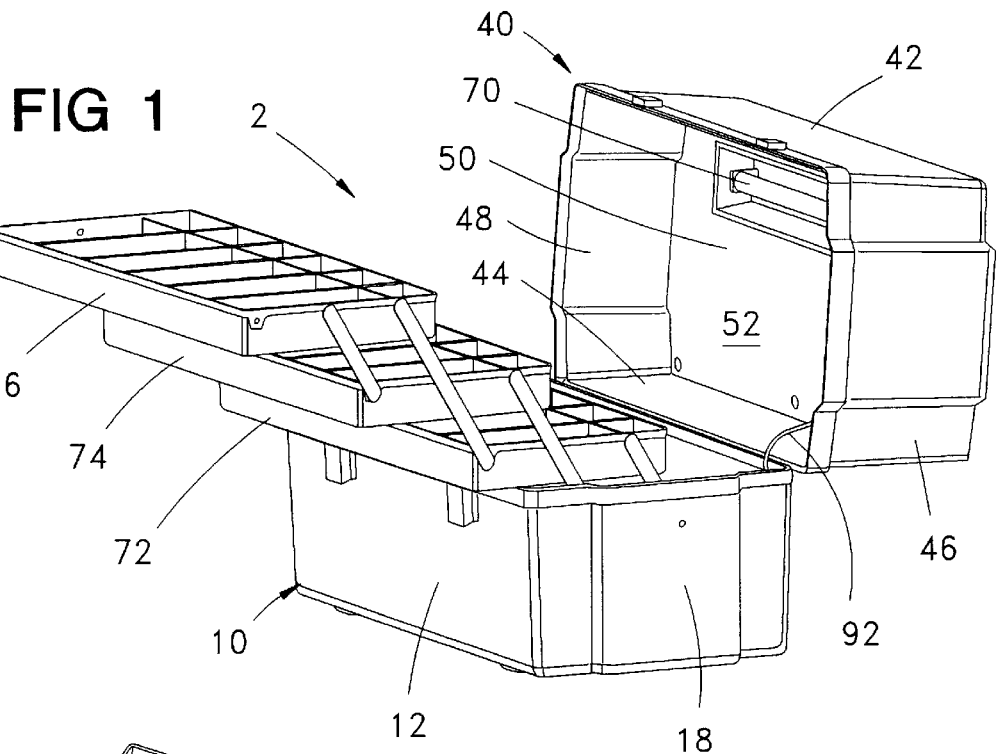
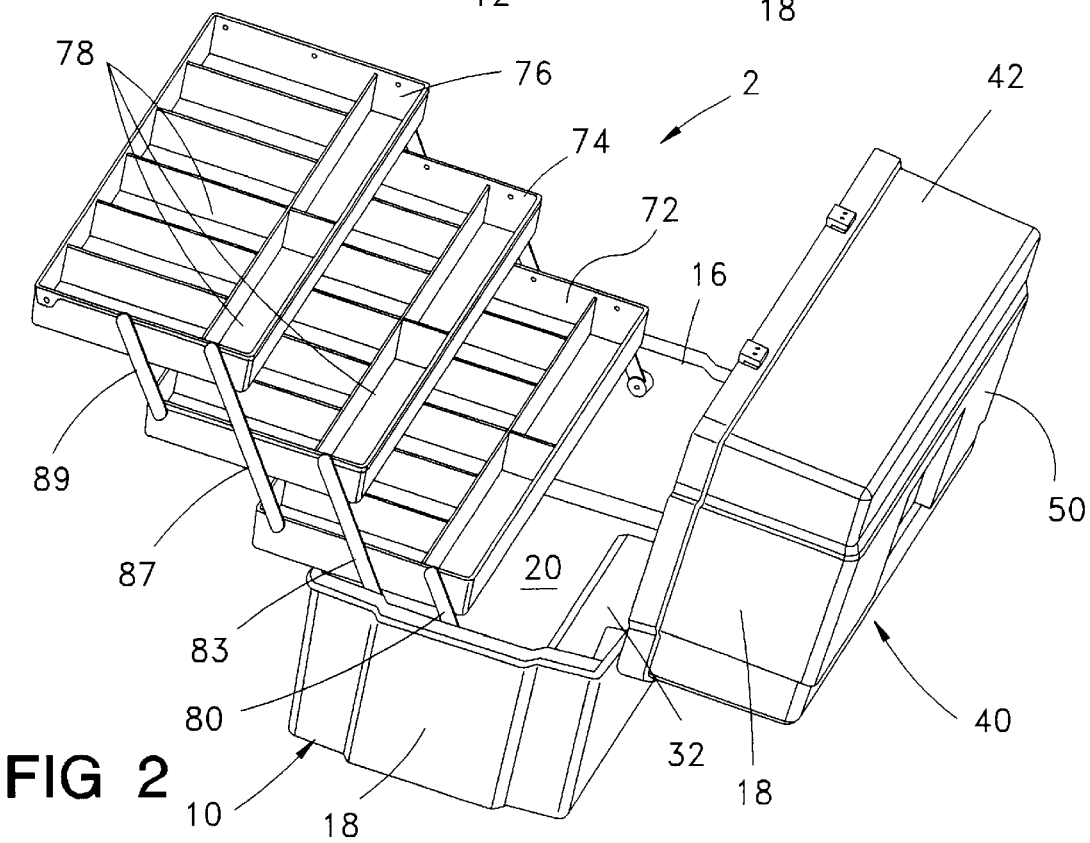

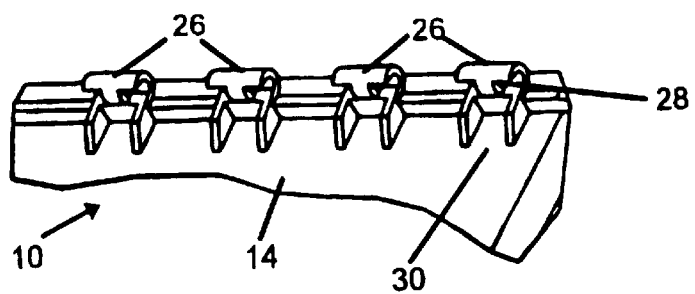
FIG 10
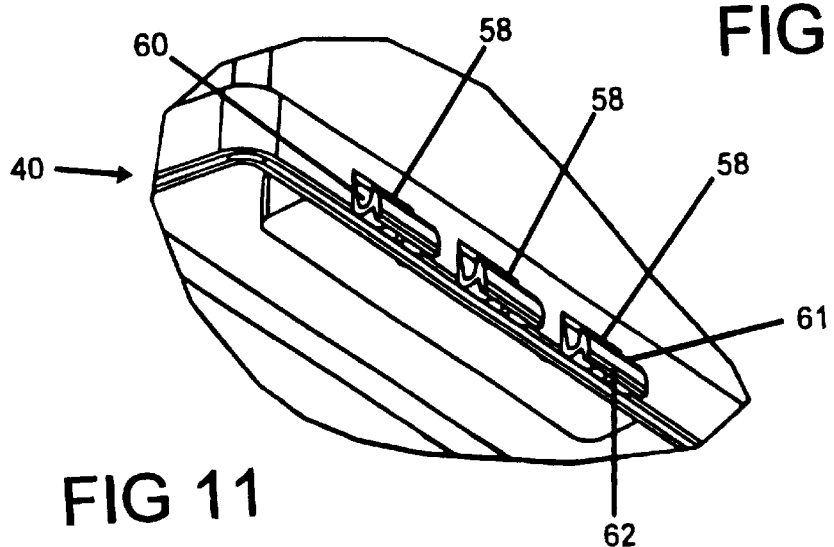
FIG 11
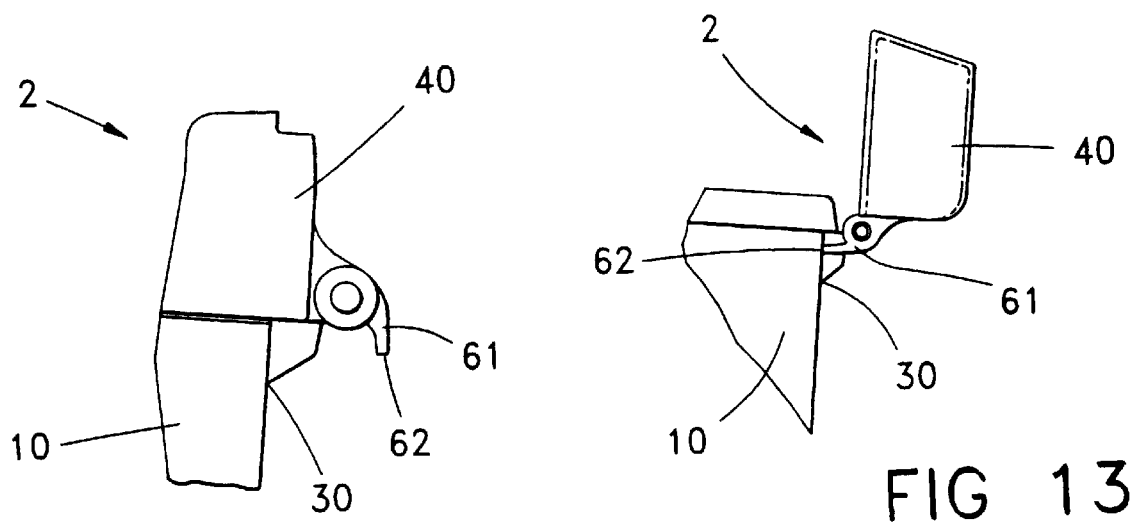
FIG 12
FIG 13

STORAGE BOX WITH UNIFORM LIGHT SOURCE

CROSS REFERENCE TO PRIOR COPENDING APPLICATIONS

This application claims the benefit of prior copending provisional application Ser. No. 60/095,032 filed Aug. 3, 1998 and prior copending provisional application Ser. No. 60/123,969 filed Mar. 12, 1999.

BACKGROUND OF THE INVENTION

1. Field of the Invention

This invention is related to a portable lighted storage boxes or containers. More specifically, this invention is related to a lighted tackle box, tool box, first aid container, or other similar container or box having a light for illuminating the box, its contents and the surrounding area.

2. Description of the Prior Art

There are many applications in which the contents of a portable storage box are to be used at night or in relatively low light conditions. In many such applications, the user can easily use a flashlight or other source of portable illumination. However, the use of a flashlight either requires the user to use one hand to hold the flashlight, leaving only one hand free or requires two people to perform an activity that would require only one if there were adequate light. For example a fisherman would typically need both hands to change lures which can be difficult when fishing at night. Of perhaps more significance is the need of an emergency worker to have both hands free to apply first aid to an injury.

A number of prior art light portable boxes have been proposed, but these boxes typically have poor illumination which not only fail to adequately illuminate the contents of the box, but also fail to illuminate the immediate surrounding area. U.S. Pat. No. 3,938,132 discloses one such illuminated fishing tackle box that has a small light to illuminate the interior of the box, but also has an external light mounted on one end of the box to serve as a flashlight as the fisherman walks about during the night. This box uses only a single point source of light which fails to provide sufficient illumination.

In many applications, the portable box also includes fold out trays which open to expose the remainder of the storage area of the base of the box. U.S. Pat. No. 4,621,308 discloses one such box in which a light source is mounted on top of the fold out trays to illuminate the trays. The light source is however located so that it will adequately illuminate only the trays with the larger storage area in the box remaining in the dark.

Prior art boxes with folding trays typically employ a configuration in which the fold out trays rotate to the deployed configuration in the same direction as the lid or cover. U.S. Pat. No. 4,691,470 discloses a light tackle box in which the trays cover the ope lid. In a configuration of this type the deployed trays would block any light source located in the lid preventing adequate illumination of both the tray contents and the contents of the base storage area.

U.S. Pat. No. 5,611,170 discloses a version in which a flexible light wand is located on one of the folding trays in a fishing tackle box. This point source of light would illuminate only a small part of the contents of the box at any one time, and although it could illuminate most parts of the box, one at a time, it provides no means for illuminating the entire box, including the trays, but also the immediate area surrounding the box, where the user would most likely perform any tasks that would either require or be greatly facilitated by the presence of adequate light.

U.S. Pat. No. 4,697,379 and U.S. Pat. No. 5,333,408 are other examples of lighted fishing tackle boxes.

SUMMARY OF THE INVENTION

A portable storage box according to the preferred embodiment includes a base having an internal storage area and a lid pivotally movable relative to the base between an open and a closed position. A light source is mounted on an interior surface of the lid. The lid is connected to the base by a hinge so that the lid pivots between the closed position and an open position. A stop surface on the base engages a companion surface on the lid to prevent rotation of the lid past a position in which the light source shines directly into the storage area in the base.

The base of this storage box has a storage area open on a top surface of the base. At least one tray is pivoted relative to the base between a stored position in which the tray is located in the storage area and a deployed position in which the tray is deployed at least partially beside the storage area. The deployed position of the tray is on an opposite side of the base from the open position of the lid. The light source on the lid is thus positioned in opposed relationship to the tray so that the light source illuminates both the tray and the storage area in the base.

The portable box in the preferred embodiment of this invention has a rectangular base with an open storage area and a rectangular lid hinged relative to the base. A linear or elongate fluorescent tube having substantially uniform light intensity between opposite ends is mounted on an interior surface of the lid. The fluorescent tube extends from adjacent one end of the rectangular lid to adjacent and opposite end of the lid so the flourescent tube extends lengthwise relative to both the base and the lid. The fluorescent tube provides substantially uniform illumination between opposite ends of the open storage area when the lid is in an open position. The flourescent tube also illuminates the immediate surrounding area.

A portable storage box having these features can thus be used for a number of applications, such as a fishing tackle box, an emergency or first aid kit, a tool box, a picnic basket or other storage containers where the contents are to be used at night or in low light environments.

Other objects of this invention include the ability to position the light source in an upright position so that it can illuminate not only the contents of the box, but also the immediate surrounding area. This invention achieves this object by positioning the lid in an upright position in which the hinges lock the lid in place and in which the light is positioned in the lid so that it will not tend to close the lid.

The components of the box including the light and the batteries should also positioned so that the box is be balanced so that it can be more easily carried by its user.

These and other objects are achieved by a portable storage box having at least some of the features included in the preferred embodiment described herein in detail.

BRIEF DESCRIPTION OF THE DRAWINGS

FIG. 1 is a view of a tackle box showing the trays in a deployed configuration and showing a fluorescent lamp in the open lid.

FIG. 2 is a view showing the tackle box in the same configuration as FIG. 1, showing the battery compartment in the bottom bin box.

FIG. 10 is a view of the hinge on the bottom bin box.

FIG. 11 is a view of the hinge on the lid.

FIG. 12 is a fragmentary view showing the position of the hinges when the lid is closed.

FIG. 13 is another fragmentary view showing the manner in which the hinges hold the lid upright when the lid is in the open position so that the light can illuminate the storage area in the bottom bin, the trays and tray compartments, and the surrounding area.

DETAILED DESCRIPTION OF THE PREFERRED EMBODIMENT

Figure 3:
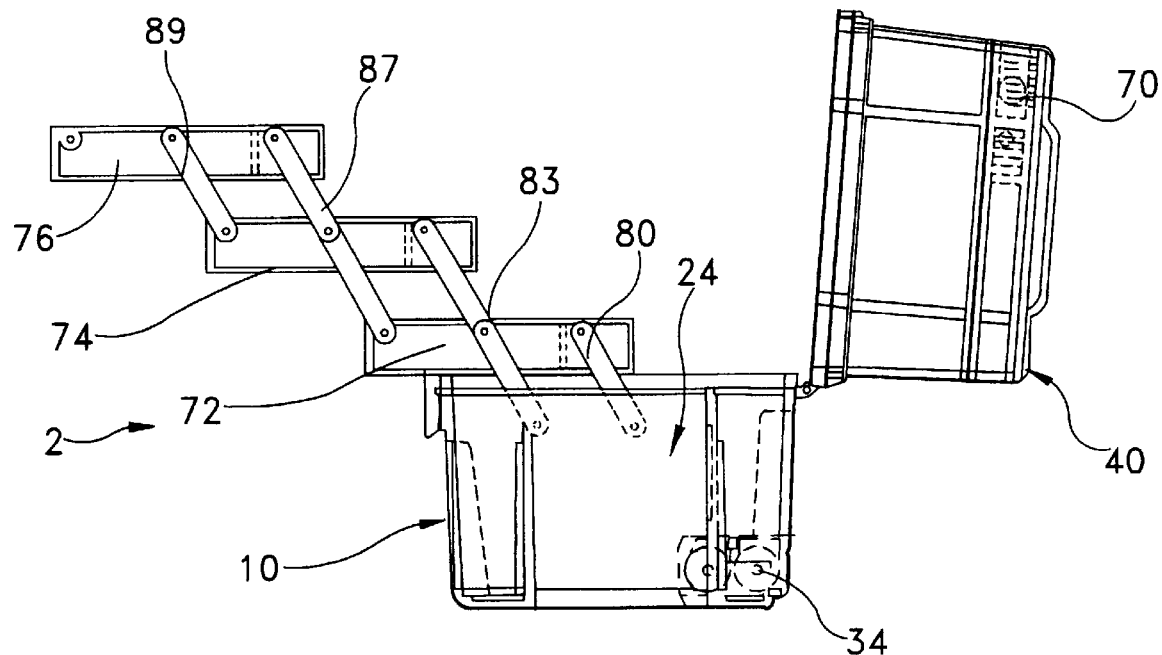
FIG. 3 is a side view of the tackle box in the deployed configuration.

The preferred embodiment of this portable lighted storage box 2 is a fishing tackle box. It should be understood, however, that the uniform illumination provided by this invention, can be employed as a tool box, as a box for a first aid kit or medical supplies, as a toy storage chest or for any number of applications. In each of these various applications, the storage box 2 comprises a base or bottom bin 10 with a hinged lid 40 attached to the base 10. A light source, preferably a fluorescent lamp 70, is mounted on the interior of the lid 40, so that the light 70 can be used to illuminate the interior of the bottom bin 10 and the immediate surrounding area when the lid 40 is in an open position.

The major components of storage box 2, including the base 10 and the lid 40, are formed by injection molding a suitable plastic, such as polypropylene. The base 10 has a generally rectangular configuration, having a lateral length dimension greater than its width and depth. Base 10 is formed as a single molded piece including a front wall 12, an opposite rear wall 14, a first end wall 16, and a second end wall 18, all of which extend from a base bottom wall 20. These walls form a generally rectangular storage area 24 that is open at the top of the base 10. Molded hinges 26 are formed along the top edge of the rear base wall 14 so that a lid 40 can be attached to the base rear wall 14 so that the lid 40 can pivot between a closed and an open position. Batteries 34 are mounted on the bottom wall interior surface 22 in a conventional manner. In the preferred embodiment of this invention, eight cylindrical D-cell batteries 34 are located end to end in two rows. The batteries 34 are centered between the opposite ends of the rectangular base 10 with the batteries extending in the lengthwise direction. The weight of the batteries 34 is thus evenly distributed between the opposite ends of the rectangular storage box 2. A molded battery lid 32 can be snapped into place in a conventional manner to cover the batteries. Conventional battery terminals (not shown) are employed in the battery storage compartment, and these terminals are connected to a flourescent light fixture assembly in the lid 40 by a flexible cable 92 that extends upward through a notch 33 in a corner of the battery lid 32.

The lid or cover 40 is also injection molded as a single piece including a front panel 42, an opposite rear panel 44, a first end panel 46, and a second end panel 48, all of which depend from edges of a rectangular lid top panel 50. Molded hinges 58 are formed along the bottom edge of the lid rear panel 44. Conventional hinge pins (not shown) connect the lid hinges 58 to the base hinges 26. The structure of these hinges will be subsequently discussed in greater detail. Fluorescent lamp 70 is mounted in a plastic mounting fixture 64 that is attached to the top panel interior surface 52 and includes tube mounting fixture 64 and a cable access opening 68. The flourescent lamp 70 is preferably a twelve inch standard fluorescent tube. In the preferred embodiment, an F8T5 fluorescent lamp is used. A simple on-off switch, not shown in detail, can be positioned adjacent to the flourescent lamp 70 to prevent the batteries from being discharged when the light is not needed.

The fluorescent tube 70 is mounted with its lengthwise dimension extending parallel to the longest external dimension of the rectangular box 2, and the tube 70 is centered between opposite end panels 46, 48 to evenly distribute light between opposite ends of the box 2. The flourescent lamp 70 is however located adjacent the lid front panel 42 and spaced from the lid rear panel 44, so that the lamp 70 is at the maximum possible height when the lid is in the upright open position shown in FIGS. 1–3. By positioning the fluorescent lamp in this manner, maximum uniform illumination can be provided and the weight of the lamp 70 and lamp mounting fixture will be balanced between opposite ends of the box 2 in the same manner that the batteries are balanced. By positioning the flourescent lamp 70 on the interior surface 52 of the lid top panel 50, the fluorescent lamp 70 will also be positioned behind the axis formed by hinge pins connecting base hinges 26 to lid hinges 58, so that the lid 40 will not tend to close when positioned in the upright open position shown in FIGS. 1–3. A conventional handle 54 is located at the center of the outer surface of the lid top panel 50 and conventional latches 56 are located adjacent the bottom edge of front lid panel 42.

Figure 4:
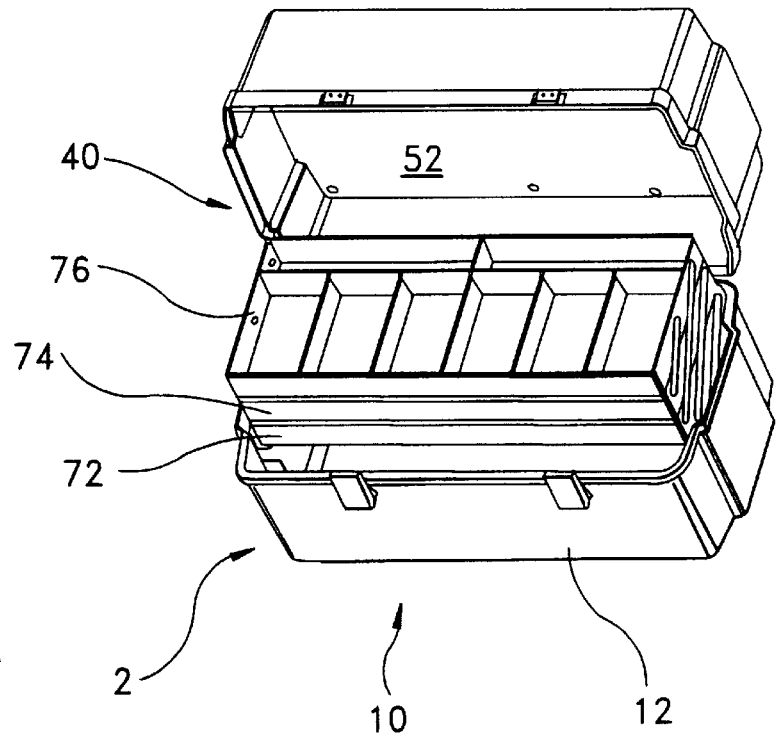
FIG. 4 is a view of the tackle box with the trays in the stored configuration.
Figure 5:
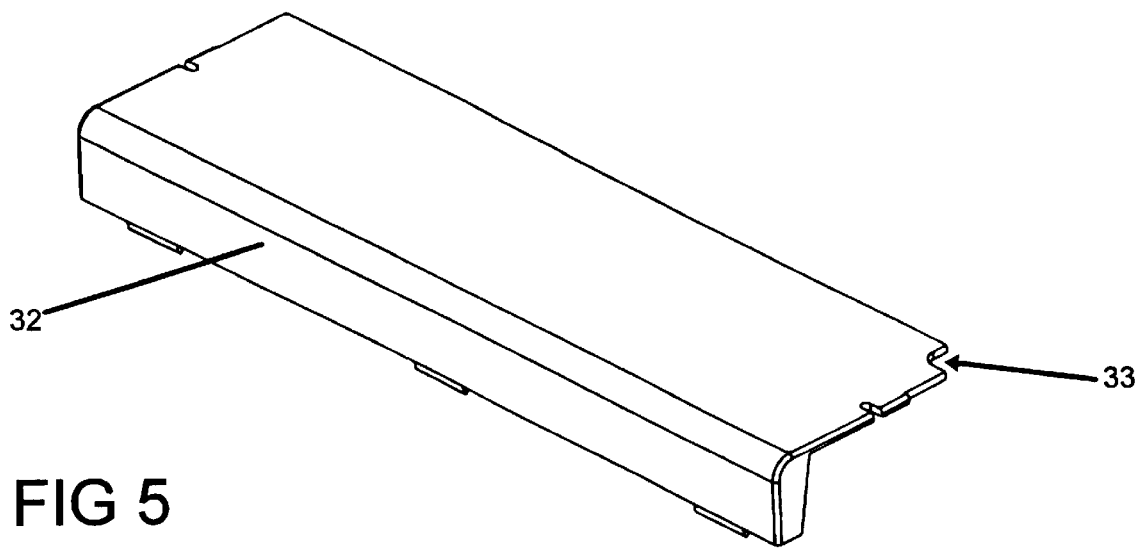
FIG. 5 is a view of the battery pack cover.
Figure 6:
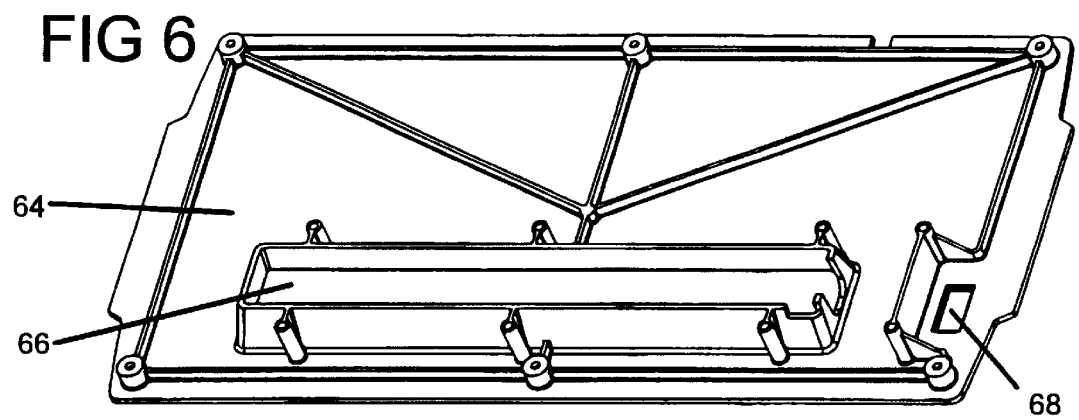
FIG. 6 is a view of the fluorescent lamp mounting panel that can be positioned in the lid.
Figure 7:
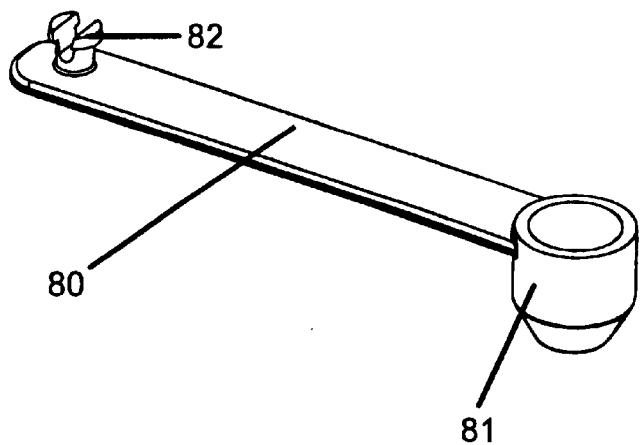
FIG. 7 is a view of a pin arm that is mounted between the bottom bin box and the lower tray.
Figure 8:
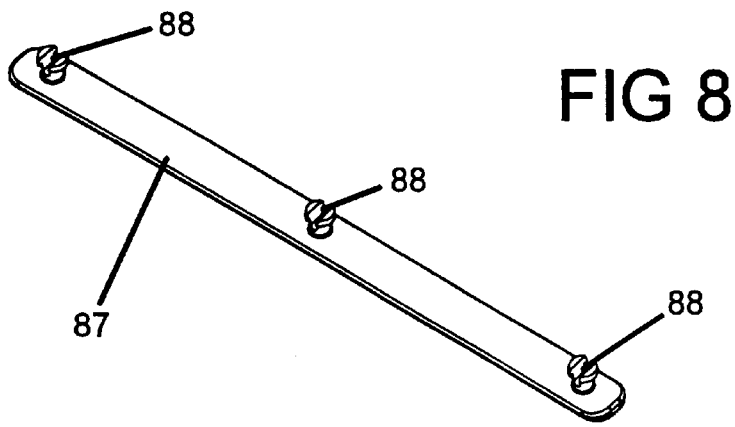
FIG. 8 is a view of a pin arm that is attachable to three trays.
Figure 9:
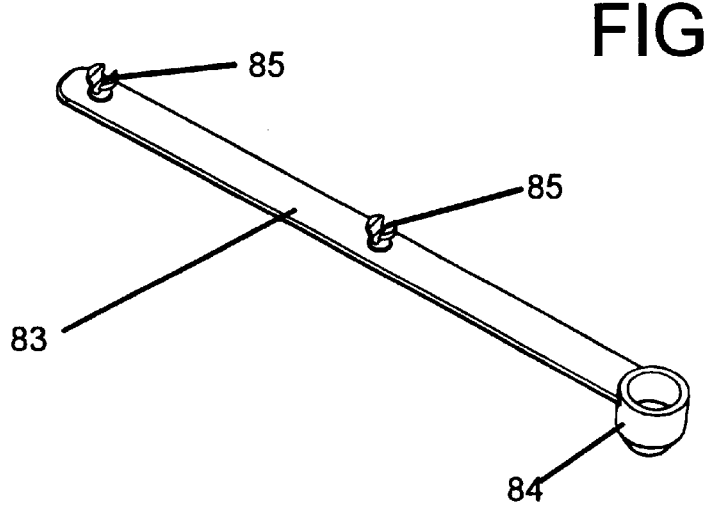
FIG. 9 is a view of a pivot pin arm that extends between the bottom bin box and the two lowermost trays.

Three molded plastic trays 72, 74 and 76 are mounted on the bottom bin 10 by arms 80, 83 which are attached to end walls 16, 18 and to the lower tray 72 and the middle tray 74, and by arms 87, 89 which respectively connect the three trays and the two top trays. All three trays 72, 74 and 76 are rotatable relative to the four arms 80, 83, 87, 89 so that the trays can be pivoted between a stored configuration shown in FIG. 4 and a deployed configuration shown in FIGS. 1–3. The trays 72, 74 and 76 are rotated to their deployed configuration in the direction opposite form the direction in which the lid is rotated from its closed to its open position. Thus is if the lid 40 is rotated through a positive clockwise angle to open the lid, the trays 72, 74 and 76 would be rotated through a negative counterclockwise angle to the open position as shown in FIGS. 1–3.

Two lower pivoting tray mounting arms 80 connect the lower tray 72 to the opposite end walls 16, 18. Arms 80 has a hub 81 at one end which is rotatable connected to the end walls by a pin, not shown, so that he arms 80 can rotate through an angle of more than ninety degrees. A molded snap latch 82 is located at the opposite end of each arm 80. These snap latches 82 can be inserted through holes in the sides of the lower tray 72.

Second pivoting tray mounting arm 83 connect both the lower tray 72 and the middle tray 74 to the end walls 16, 18 of the base 10. Hub 84 mounts this arm 83 to the end walls 16, 18 in the same manner as hub 81 mounts the lower arm 80. These two hubs 81, 84 are mounted to the end walls 16, 18 at the same elevation and are mounted side by side. Second pivoting tray mounting arms 83 has two snap latches 85 which are snapped into holes on the sides of both tray 72 and 74.

Third arms 87, each with three molded snap latches 88 connect the three trays 72, 74 and 76 with each tray being rotatable relative to the third arms 87 snapped into holes at opposite ends of the trays. Fourth tray arms 89 also connect the two top trays 74, 76 in the same manner. The four arms 80, 83, 87, 89 are also rotated relative to the base 10 when moved from the stored configuration shown in FIG. 4 to the deployed configuration shown in FIGS. 1–3. These arms rotate through a negative angle to deploy the trays when compared to the positive angle through which the lid 40 rotates to the open configuration.

FIGS. 10–13 show the manner in which the lid 40 is hinged to the base 10. The base or bottom bin 10 has a series of molded latches 26 spaced apart along the upper edge of the rear base wall 14. Each of the hinges has a hole 28 through which a pin (not shown) can be inserted when the lid hinges 58 are mated to the base hinges. The exterior of the wall 14 adjacent to the hinges 28 form stop surfaces that interact with stop surfaces 62 on the lid hinges 58 to stop rotation of the lid 40 relative to the base 10 to position the lid 40 in a upright relationship with respect to the base 10 in the open position shown in FIGS. 1–3.

Lid hinges 58 also have holes 60 through which the pins inserted through base hinge holes 28 extend to connect mating hinges 16 and 58. Lid hinges 58 also have fingers 61 that extend to a stop surface 62 best seen in FIG. 12. When the lid 40 is rotated to the open position, the stop surface 62 at the end of extension 61 abuts aligned stop surfaces 30 on the base 10 to prevent further rotation so that the light 70 is in an exposed position to illuminate the trays 72, 74, 76, and the storage area 24 in the base and the surrounding area.

The preferred embodiment of this invention is in the form of a fishing tackle box in which the trays 72, 74, 76 have individual compartments 78 in which fishing lures can be placed. Although this invention, and especially certain aspects of this invention, are of particular relevance to its use as a fishing tackle box, its use is not so limited. For example, this invention can be used as a first aid or emergency medical kit. The flourescent tube 70 provides even illumination along the entire length of both the trays and the storage area, but also of the immediate surrounding area. This capability of lighting the surrounding area would free both of the user's hands since he would not need to hold a flashlight. The invention could also be employed as a tool kit in which a removable tray could be placed beside the box where it would still be illuminated by the light source 70. Other applications, such as a storage box, a picnic basket, or a toy box would also be apparent to one of ordinary skill in the art. Therefore the version of the invention depicted herein is representative of other equivalent embodiments, and one of ordinary skill in the art would understand that equivalent subcomponents could be substituted for those shown herein. For example, in one such modification, a rechargeable battery could be employed. Small heating or cooling elements could also be added. The manually operated on-off switch could be replaced by a switch that is activated and deactivated when the lid is open and closed. Therefore this invention is defined by the following claims and is not limited to its preferred embodiment.

What is claimed is:

1. A box for storing a plurality of individual devices comprising:

a base having a storage area open on a top surface of the base;

a lid hinged relative to the base so that the lid is free to rotate between a closed position in which the lid encloses the storage area and an open position;

a light source mounted on an interior surface of the lid;

at least one tray pivoted relative to the base between a stored position in which the tray is located in the storage area and a deployed position in which the tray is deployed at least partially beside the storage area, the deployed position of the tray being on an opposite side of the base from the open position of the lid to position the light source on the lid in opposed relationship to the tray so that the light source illuminates both the tray and the storage area in the base.

2. The box of claim 1 wherein a plurality of trays are pivoted relative to the base with the trays being progressively mutually offset so that each tray is exposed to direct illumination from the light source on the lid when the lid is in the open position.

3. The box of claim 1 wherein the lid is rotated to the open position through a positive angle and each tray is rotated to the deployed position through a negative angle.

4. The box of claim 1 wherein rotation of the lid is limited so that the lid is in an upright position with the light source above the tray and the storage area when the lid is in the open position.

5. The box of claim 1 wherein the base, the lid and each tray have a generally rectangular shape and the light source is an elongate tube extending along most of the maximum linear dimensions of the base, the lid and each tray to provide substantially uniform illumination of the storage area and each tray.

6. The box of claim 1 wherein the light source comprises a flourescent light source.

7. The box of claim 1 wherein a battery compartment is located in the base with a cable extending between the battery compartment and the light source on the lid.

8. The box of claim 7 wherein the battery compartment and the light source are centrally positioned between opposite ends of the box to balance the box.

9. The box of claim 7 wherein the battery compartment comprises means for positioning multiple cylindrical batteries end to end parallel to the maximum dimension of the base.

10. The box of claim 1 wherein the light source is located along an opposite side of the lid from a hinge joining the lid to the base, so that the light source will be located at a maximum elevation relative to the storage area and each tray when the lid is positioned in an upright open position.

11. The box of claim 1 wherein the light source has sufficient intensity to illuminate an area surrounding the storage box when the lid is positioned in a stationary upright open position.

12. The box of claim 1 wherein each tray includes multiple compartments configured for storage of fishing lures.

13. A portable storage box comprising a base having an internal storage area and a lid pivotally movable relative to the base between an open and an closed position, a light source mounted on an interior surface of the lid, the lid being connected to the base by a hinge so that the lid pivots between the closed position and an open position, and a stop surface on the base engaged by a companion surface on the lid to prevent rotation of the lid past a position in which the light source shines directly into the storage area in the base the portable storage box including at least one tray pivotally mounted on the base.

14. The portable storage box of claim 13 wherein the stop surface and the companion surface engage after the lid has rotated through an angle of approximately ninety degrees so that the light source remains above the storage area when the lid is in the open position.

15. The portable storage box of claim 14 wherein the light source is located on an opposite side of an axis, extending through the hinge connecting the lid to the box, from the base so that the lid can remain in the open position with the stop surface engaging the companion surface.

* * * * *